United States Patent
Norvelle

(10) Patent No.: US 6,172,298 B1
(45) Date of Patent: Jan. 9, 2001

(54) TELESCOPING ELECTRICAL DISTRIBUTION PANEL

(76) Inventor: Steven D. Norvelle, 7651 Rancho Rd., Anchorage, AK (US) 99507

(*) Notice: Under 35 U.S.C. 154(b), the term of this patent shall be extended for 0 days.

(21) Appl. No.: 09/288,773

(22) Filed: Apr. 8, 1999

(51) Int. Cl.[7] .................................................. H02G 3/04
(52) U.S. Cl. .............................. 174/48; 174/50; 174/58; 220/3.3
(58) Field of Search .................. 174/48, 58, 60, 174/63, 50, 67; 220/3.2, 3.3, 3.9, 242, 4.02; 439/135, 136; 361/826

(56) References Cited

U.S. PATENT DOCUMENTS

| | | | |
|---|---|---|---|
| 2,516,464 | * 7/1950 | Hooser | 174/67 |
| 4,063,660 | * 12/1977 | Ware | 220/3.6 |
| 4,737,599 | * 4/1988 | Fontaine | 174/67 |
| 4,882,885 | * 11/1989 | Chatterson et al. | 174/48 |
| 5,067,907 | * 11/1991 | Shotey | 439/135 |
| 5,107,075 | * 4/1992 | Currier, Jr. | 174/67 |
| 5,206,777 | * 4/1993 | Clarey et al. | 361/63 |
| 6,031,183 | * 2/2000 | Guerrieri | 174/67 |

* cited by examiner

Primary Examiner—Kristine Kincaid
Assistant Examiner—Dhiru R Patel
(74) Attorney, Agent, or Firm—Michael J. Tavella

(57) ABSTRACT

An electrical panel having an extendible lower portion. The panel has an overall size equivalent of an ordinary panel. However, approximately one third of the panel is cut off and removed. This separate bottom piece is then replaced and held in place with thumbscrews. Thus, when stored, the lower portion is pushed up against the bottom of the cut portion. This reduces the overall length of the panel. The wires can then be placed into the panel and the panel can be secured inside the wall without having to cut a larger hole. Once the upper portion of the panel is secured, the lower portion can be extended downward until the opening is fully filled. The thumbscrews can be locked in place and the fully extended panel is then ready for wiring. A bonding jumper is used to ensure a proper ground between the two portions. Other than the bonding jumper and locking the extended panel into place, the panel is then made up as usual.

3 Claims, 4 Drawing Sheets

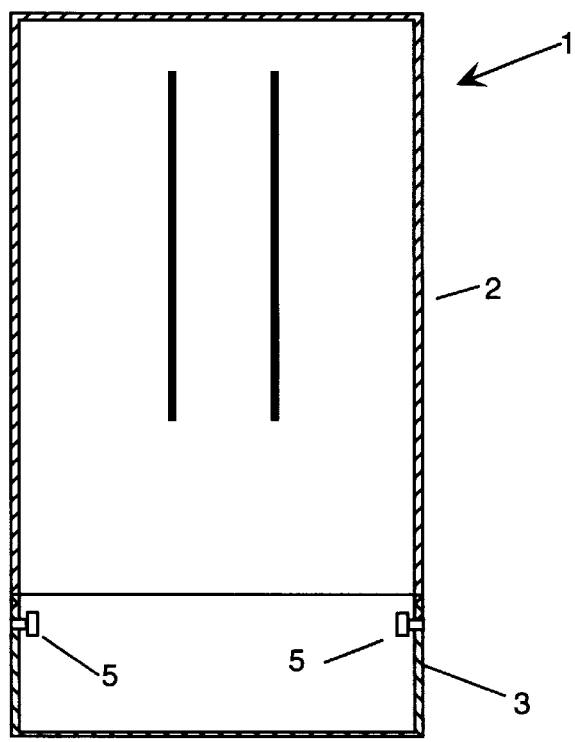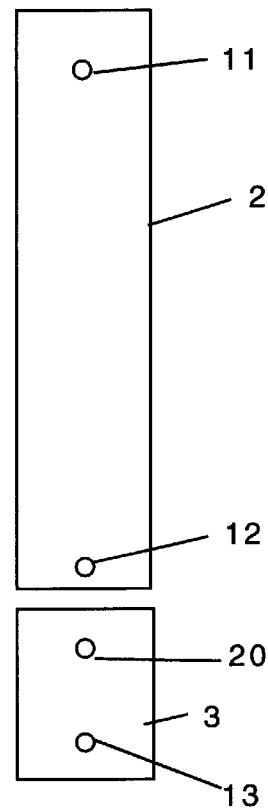
Figure 1           Figure 2

TELESCOPING ELECTRICAL DISTRIBUTION PANEL

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the invention

This invention relates to electrical distribution panels and particularly to electrical distribution panels having a telescoping portion.

2. Description of related art

Electrical distribution panels are used in virtually every business and residence. These panels hold circuit breakers and act as load centers. All wiring related to the home or business is routed through these boxes. Panels are installed in all new construction, in electrified areas. In new construction, the panels are installed and wires are set in place before the framing is closed with sheet rock or other surface treatment. This makes installation and wiring fast, easy and convenient. In doing remodel work, however, the task of replacing a distribution panel becomes much more difficult. In many cases, these upgrades are to increase the size of the available service. For example, many older homes have 60 amp or 100 services. Although these levels may have been sufficient forty or even twenty years ago, many homes are now using 200 amp services. As such, panels must be removed and replaced. Panels have a common width to fit between normal wall stud spacing of 16 inches. Panels also have a common length, making them easy to fit into existing wall openings. However, there is one major problem. The wiring entering and leaving the panel does so at the sides, top and bottom of the panel. Thus, it is very difficult to rewire a panel and have it drop nicely into an existing hole. Often, the wallboard must be cut to give enough room to bring the wires into the panel. Once cut, costs increase for repair and painting of the wall.

BRIEF SUMMARY OF THE INVENTION

The instant invention overcomes this difficulty in replacing a distribution panel. The panel has an overall size equivalent of an ordinary panel. However, approximately one third of the panel is cut off and removed. This separate bottom piece this then fitted to the upper portion and held in place with grounding screws. When stored, the lower portion is pushed up against the bottom of the cut portion. This reduces the overall length of the panel. During installation of the panel, the wires can be placed into the reduced-height panel and the panel can be secured inside the wall without having to cut a larger hole. Once the upper portion of the panel is secured, the lower portion can be extended downward until the opening is fully filled. The grounding screws can be locked in place and the fully extended panel is then ready for wiring. An alternative design uses a bonding jumper to ensure a proper ground between the two portions. Another design uses slots to allow for better adjustment of the panel in a wall, as needed. Once the panel is installed, the panel is then made up as usual.

BRIEF DESCRIPTION OF THE DRAWINGS

FIG. 1 is a front view of the preferred embodiment as fully assembled.

FIG. 2 is a side view of the invention as disassembled, showing the preferred embodiment.

DETAILED DESCRIPTION OF THE INVENTION

Figure 3:
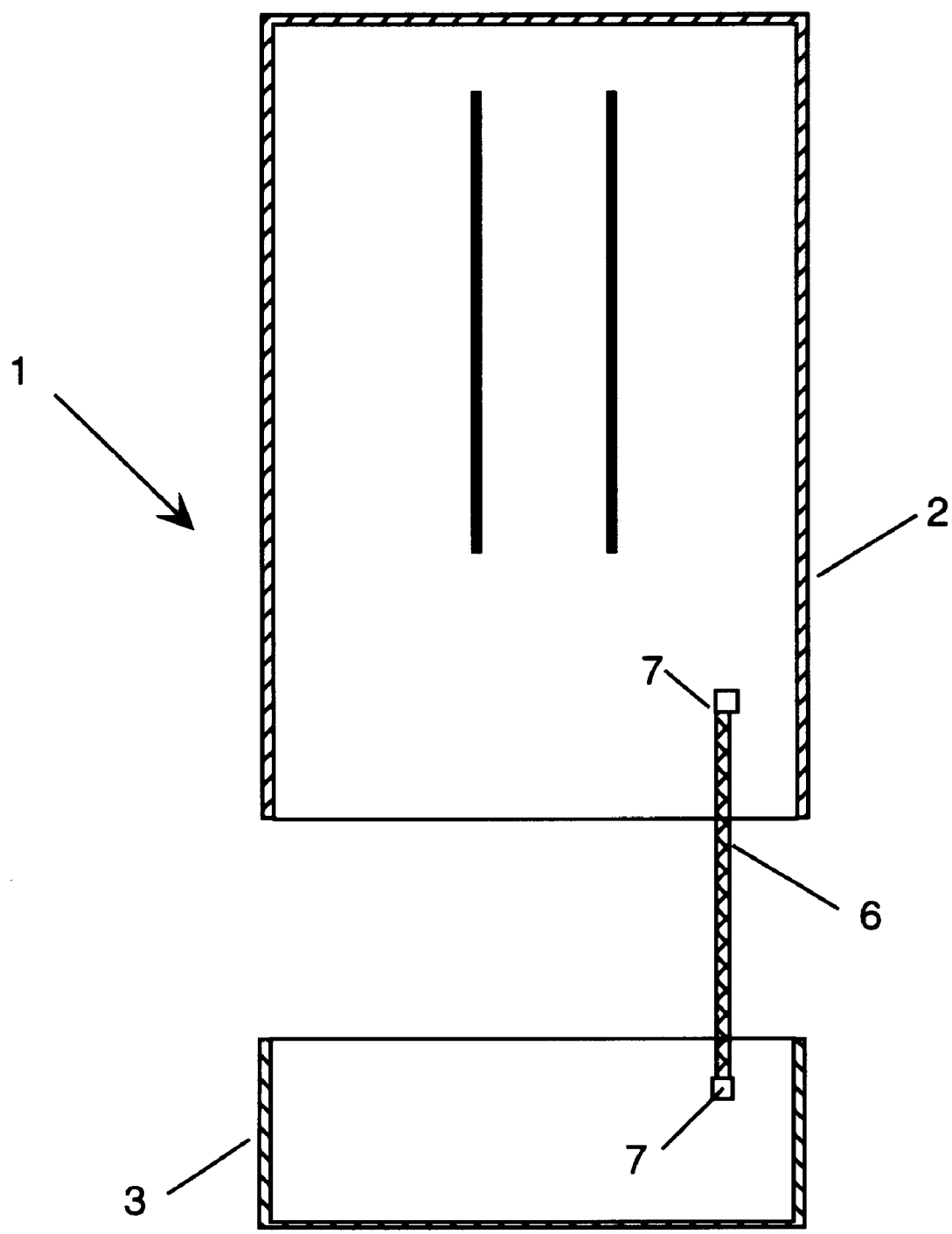
FIG. 3 is a front view of the invention as disassembled.

Referring now to FIGS. 1 through 6, the invention consists of a two piece electrical panel 1. The panel has an upper portion 2 and a lower portion 3. The panel 1 is designed so that when fully assembled, as shown in FIG. 1, the panel fits into an ordinary panel opening for the type of panel chosen. FIG. 1 shows the panel 1 as fully assembled. Here, the lower portion 3 is secured to the upper portion using two wing nuts 5 (or similar fastener). Secured in this way, the two pieces become like a single panel. To ensure proper grounding between the two parts, a bonding jumper 6 may be installed in lugs 7 as shown. The bonding jumper 7 is an option. In the preferred embodiment, wing nuts 5 are used to ground the upper portion to the lower portion. FIG. 2 shows a side view of the upper portion 2 and the lower portion 3 as disassembled. As shown in FIG. 2, the bottom of the upper panel 2 has a hole 12. The top of the lower panel has a hole 20 and the bottom of the lower panel has a hole 13. This view shows the preferred embodiment. In this embodiment, there is no bonding jumper, as discussed above. The wing nuts 5 connect the upper and lower portions together as shown. The length of the fully extended panel is not adjustable. However, in most cases, the panel opening in a wall is of a uniform size and no adjustment in the length of the panel is needed.

Figure 4:
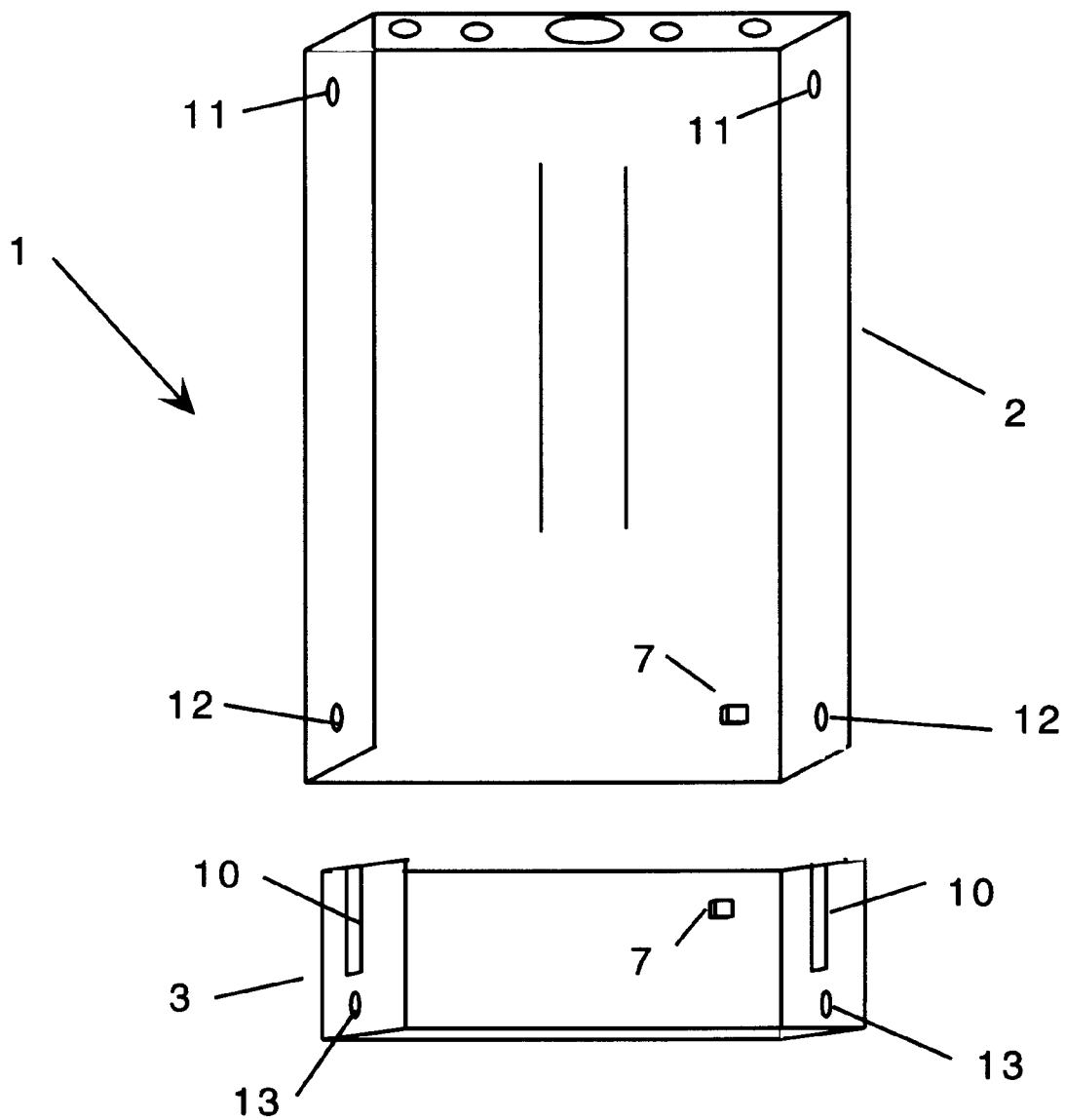
FIG. 4 is a perspective view of the invention as disassembled, showing an alternative embodiment.

A second embodiment is provided as shown in FIG. 4, for example. In this embodiment, a slot 10 is provided in the lower portion to allow the lower portion 3 to be adjusted with respect to the upper portion 2. A lower hole 12 is provided on both sides of the upper portion 2. This hole is used to pass the wing nut 5 (or other fastener) through the upper portion to secure the lower portion to it. The slots 10 allow the length of the panel to be adjusted. Here, however, the bonding jumper should be used to ensure a proper ground.

In both embodiments, a hole 13 is provided at the bottom of each side of the lower portion 3. This hole is used to secure the lower portion to wall studs. An upper hole 11 is provided on both sides of the upper portion 2. These holes are used to secure the upper portion 2 to wall studs.

FIG. 3 is a front plan view of the upper portion 2 and the lower portion 3 disassembled. FIG. 4 is a perspective view of the disassembled upper portion 2 and lower portion 3 showing the slot 10, and mounting holes 11 and 12.

Figure 5:
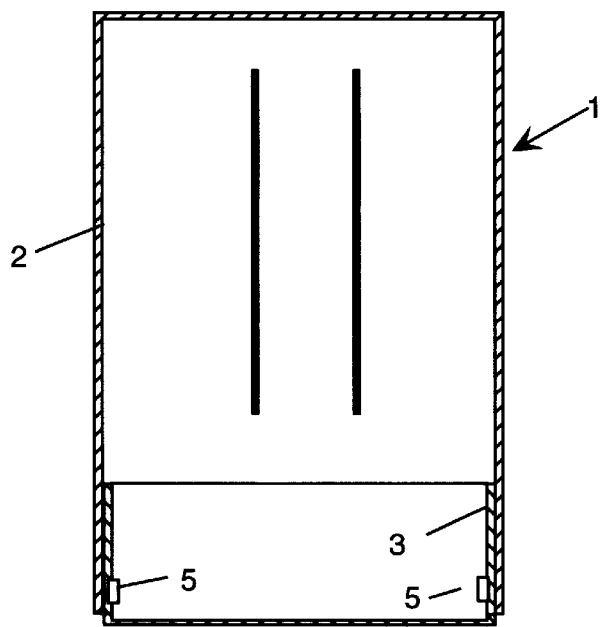
FIG. 5 is a front view of the invention with the lower portion collapsed for shipment or initial installation.
Figure 6:
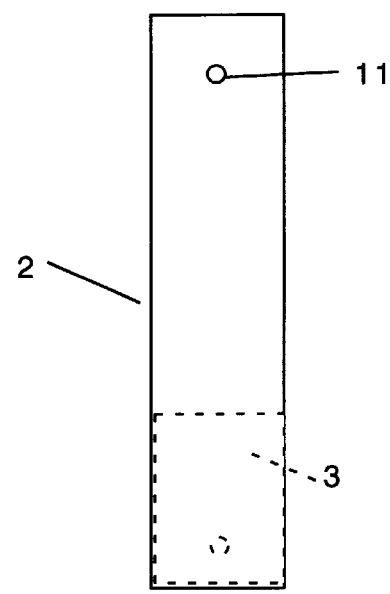
FIG. 6 is a side view of the invention with the lower portion collapsed.

FIG. 5 is a front plan view of the device in the collapsed state. Here, the lower portion 3 is filly slid up into the upper portion 2. The lower portion is secured using bolts 5 or similar fasteners. In this position, the panel is ready for installation into a wall. FIG. 6 is a side view of the collapsed panel.

To use the device, the panel 1 is prepared for installation leaving the lower portion 3 compressed in the upper portion 2, as shown in FIGS. 5 and 6. The panel is placed in the panel wall opening. If there are wires coming down from the top, the panel is placed at the bottom of the opening and those wires are placed into the box using normal construction methods. Once the wires are secured, the panel is moved up until the upper portion 2 is at the top of the opening. The upper portion 2 is then secured in place. Any wires at the bottom of the panel can then be installed in the lower portion 3 using normal methods. When all wires are in place, the lower portion 3 is lowered until the bottom of the panel meets the bottom of the opening. The lower portion 3 is then locked in place with respect to the upper portion 2 and the lower portion 3 is then secured to the wall studs. The bonding jumper 6 is then secured between the upper portion 2 and the lower portion 3. At this point, the panel is ready for wiring in the normal manner. Circuit breakers (not shown) can be installed and the connection can be made up in the usual manner. Once in place, the panel operates exactly like a standard panel in all respects.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A telescoping electrical panel for installation in a wall comprising:

a) an upper portion, having a top, two opposed sidewalls and an open bottom, said upper portion also having a bonding lug, fixedly attached near the open bottom of said upper portion, said upper portion also having a threaded hole formed in each of said opposed sidewalls near said open bottom of said upper portion;

b) a lower portion having a bottom, two opposed sidewalls and an open top, said lower portion being slidably engaged with said upper portion, whereby the open upper of said lower portion is in alignment with the open bottom of said top portion, said lower portion also having a bonding lug, fixedly attached to said lower portion near the open top of said lower portion, said lower portion also having a slot formed in each of said opposed sidewalls, said slot allowing adjustment of said telescoping electrical panel to a desired length by using said threaded hole formed in each of said opposed sidewalls near said open bottom of said upper portion when said upper portion and said lower portion are joined; and d) a pair of bolts, each of said pair of bolts passing through the slot in one of said opposed sidewalls of said lower portion and being threadably engaged in one of said threaded holes in said upper portion.

2. The telescoping electrical panel of claim 1 further comprising a bonding jumper in electrical communication with said bonding lug in said upper portion and said bonding lug in said lower portion.

3. The telescoping electrical panel of claim 1 further comprising a means for attaching said telescoping electrical panel to a wall.

* * * * *